United States Patent
Jones

(10) Patent No.: US 10,046,859 B2
(45) Date of Patent: Aug. 14, 2018

(54) ANTI-ICING SYSTEMS

(71) Applicant: Goodrich Actuation Systems Limited, Shirley, West Midland (GB)

(72) Inventor: Tony Jones, Birmingham (GB)

(73) Assignee: GOODRICH ACTUATION SYSTEMS LIMITED, Shirley, West Midland (GB)

( * ) Notice: Subject to any disclaimer, the term of this patent is extended or adjusted under 35 U.S.C. 154(b) by 87 days.

(21) Appl. No.: 14/996,050

(22) Filed: Jan. 14, 2016

(65) Prior Publication Data

US 2016/0200442 A1 Jul. 14, 2016

(30) Foreign Application Priority Data

Jan. 14, 2015 (EP) ..................... 15275011

(51) Int. Cl.
| | | |
|---|---|---|
| *B64D 15/04* | (2006.01) | |
| *B64D 15/02* | (2006.01) | |
| *B64D 33/02* | (2006.01) | |
| *F01D 25/02* | (2006.01) | |
| *F02C 7/047* | (2006.01) | |
| *F16K 31/12* | (2006.01) | |
| *F16K 31/122* | (2006.01) | |

(Continued)

(52) U.S. Cl.
CPC ............ *B64D 15/02* (2013.01); *B64D 33/02* (2013.01); *F01D 25/02* (2013.01); *F02C 7/047* (2013.01); *F16K 3/267* (2013.01); *F16K 31/12* (2013.01); *F16K 31/1223* (2013.01); *F16K 31/1245* (2013.01); *F16K 31/52475* (2013.01); *B64D 2033/0233* (2013.01); *F05D 2260/84* (2013.01)

(58) Field of Classification Search
CPC ........ B64D 15/00; B64D 15/02; B64D 15/04; B64D 2033/0233; F01D 25/02; F02C 7/047; F05D 2260/84
See application file for complete search history.

(56) References Cited

U.S. PATENT DOCUMENTS 2,868,483 A * 1/1959 Krueger ................. B64D 15/02
236/92 R
3,901,266 A * 8/1975 Guy ..................... G05D 7/0153
137/219

(Continued)

FOREIGN PATENT DOCUMENTS

| EP | 2423488 A2 | 2/2012 |
|---|---|---|
| GB | 1295092 A | 11/1972 |
| WO | 2014182289 A1 | 11/2014 |

*Primary Examiner* — Richard G Davis
(74) *Attorney, Agent, or Firm* — Cantor Colburn LLP

(57) ABSTRACT

A bleed air pressure regulation system for an aircraft anti-icing system comprises a first, upstream pressure regulating valve and a second, downstream pressure regulating valve arranged in series in a bleed airflow path. The respective pressure regulating valves each have a regulating pressure chamber in fluid communication with a respective pressure setting valve. Each pressure setting valve is in fluid communication with a bleed air inlet upstream of the first, upstream pressure regulating valve. The first, upstream pressure regulating valve is set to regulate the pressure of the bleed air to a first pressure and the second, downstream pressure regulating valve is set to regulate the pressure of the bleed air to a second pressure which is higher than the first pressure.

10 Claims, 2 Drawing Sheets

(51) Int. Cl.
*F16K 31/124* (2006.01)
*F16K 31/524* (2006.01)
*F16K 3/26* (2006.01)

(56) References Cited

U.S. PATENT DOCUMENTS

| | | | | |
|---|---|---|---|---|
| 2010/0001138 A1* | 1/2010 | Dasilva | ............... | B64D 15/04 244/134 B |
| 2012/0045317 A1* | 2/2012 | Saladino | ............... | F02C 6/08 415/145 |
| 2015/0275758 A1* | 10/2015 | Foutch | ............... | F02C 7/047 60/779 |
| 2015/0291284 A1* | 10/2015 | Victor | ............... | B64D 15/04 244/134 B |

* cited by examiner

ANTI-ICING SYSTEMS

FOREIGN PRIORITY

This application claims priority to European Patent Application No. 15275011.3 filed on Jan. 14, 2015, the entire contents of which is incorporated herein by reference.

TECHNICAL FIELD

The present disclosure relates to anti-icing systems for use, for example, in aircraft and more particularly to a bleed air pressure regulation system for use in such a system.

BACKGROUND OF THE INVENTION

Various areas of aircraft structures are subject to ice formation in use and are therefore provided with anti-icing systems. One such area is an engine cowl inlet. The anti-icing system may use bleed air taken from the engine, for example from a compressor stage, to heat the nacelle inlet. The bleed air is typically controlled by a valve which limits the pressure of the air within the inlet so as to avoid damage to the inlet. The air bleed system may also incorporate a shut-off valve for safety purposes.

It would be desirable to provide an anti-icing system which has improved availability in the event of a valve failure.

SUMMARY

The present disclosure provides a bleed air pressure regulation system for an aircraft anti-icing system, the bleed air control system comprising a first, upstream pressure regulating valve and a second, downstream pressure regulating valve arranged in series in a bleed airflow path, the upstream pressure regulating valve being configured to regulate the bleed air flow to a first pressure and the downstream pressure regulating valve being configured to regulate the bleed air flow to a second, higher pressure, but to allow passage of bleed air therethrough from the upstream pressure regulating valve at the first pressure.

The above arrangement may provide improved availability of the anti-icing system and provide redundancy in the system. With such an arrangement, should the first pressure regulating valve fail, i.e. cease to provide a regulating function, the second will still provide a regulating function. Similarly, should the second pressure regulating valve fail the first pressure regulating valve will provide a regulating function. With both regulating valves operating normally, the downstream pressure regulating valve will permit the bleed air to flow through the downstream regulating valve.

The respective pressure regulating valves may each have each having a regulating pressure chamber in fluid communication with a respective pressure setting valve and the first pressure setting valve may be configured to provide a first pressure to the regulating pressure chamber of the upstream pressure regulating valve and the second pressure setting valve be configured to provide a second, higher pressure to the regulating pressure chamber of the downstream pressure regulating valve.

Each pressure setting valve may be in fluid communication with a bleed air inlet upstream of the first, upstream pressure regulating valve. This renders the set pressure of the second pressure regulating valve independent of the flow through the first pressure regulating valve. Due to the control pressure input for both pressure regulating valves being upstream of the first, upstream pressure regulating valve, each valve will continue to operate without interference in the event of a failure of the other.

Each pressure regulating valve may be formed with a valve body having a bleed air inlet, a regulating bore, and a regulating piston slidably received within the bore for regulating the flow of bleed air through the pressure regulating valve. The bore may define the pressure regulating chamber on one side of the regulating piston.

The bore may further comprise one or more bleed air openings in a side wall thereof, and the piston may comprise one or more bleed air inlets for selective alignment with the one or more bore bleed air openings, and a bleed air outlet, such that when the one or more piston bleed air inlets aligns with one or more bore openings, bleed air may flow from the bleed air inlet, through the one or more bore openings and the one or more piston bleed air inlets and out from a piston outlet to a further valve stage or to an area to be heated.

The regulating pressure for each respective pressure regulating valve may be set by any suitable pressure setting valve such a pressure relief or limiting valve.

The pressure setting valve may be a fixed pressure valve or a variable pressure valve.

The pressure setting valve may be connected to the bleed air path upstream of the first, upstream valve via a suitable bleed air feed line. The feed line may comprise a flow restriction such as a throttle valve, venturi or other restriction to control or limit the flow of bleed air into the bleed air feed line.

The pressure setting valves may also be connected to respective dump valves which may be opened to cause the pressure regulating valves to close.

The system may comprise just two pressure regulating valves in series, but it may comprise any number of pressure regulating valves arranged in series. In such a system, however, the control pressure feed for each pressure regulating valve should be taken from upstream of the first, most upstream, pressure regulating valve.

The system may be incorporated into any anti-icing system, but finds particular application in engine nacelle inlet anti-icing. The disclosure therefore also provides an aircraft engine nacelle anti-icing system comprising a bleed air duct in fluid communication with a source of bleed air, and a bleed air regulation system as described above in fluid communication with said bleed air duct for regulating the pressure of the bleed air supplied to the nacelle inlet by the duct.

The disclosure also provides a method of regulating bleed air in an anti-icing system comprising flowing bleed air through a first, upstream pressure regulating valve and a second, downstream pressure regulating valve arranged in series with the first pressure regulating valve, and setting the regulating pressure of the second pressure regulating valve to be higher than that of the first pressure regulating valve and such that regulated bleed air may pass therethrough from the first pressure regulating valve (32) at the first pressure.

The respective pressures may be set by means of pressure setting valves arranged in fluid communication with the bleed air flow upstream of the first pressure regulating valve. By arranging the fluid communication in this way, the regulating pressure of the second pressure regulating valve is made and independent of the flow through the first pressure regulating valve.

BRIEF DESCRIPTION OF THE DRAWINGS

An embodiment of this disclosure will now be described, by way of example only, with reference to the following drawings, in which.

DETAILED DESCRIPTION

Figure 1:
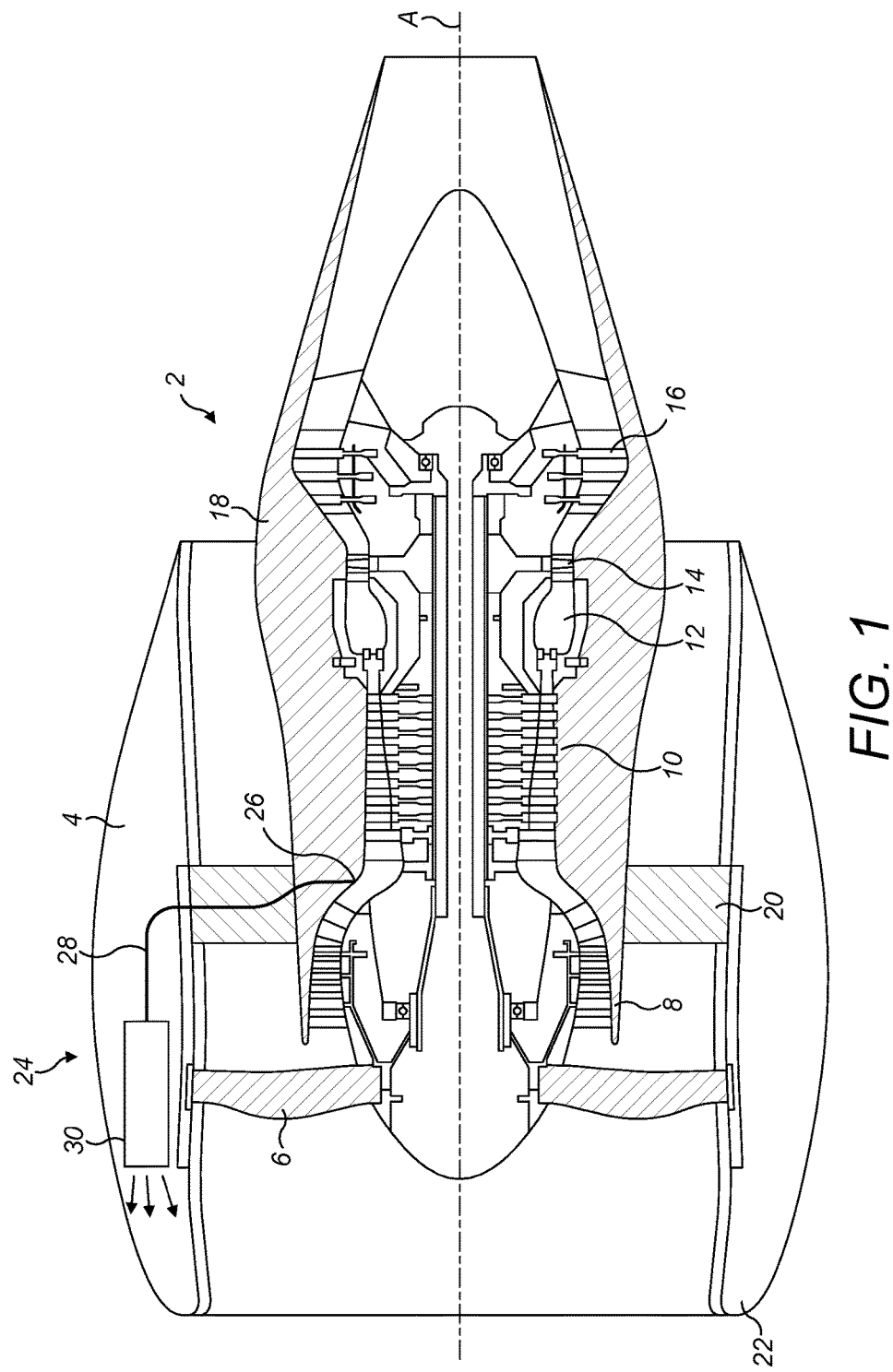
FIG. 1 illustrates, schematically, a gas turbine engine incorporating a nacelle having an anti-icing system.

With reference to FIG. 1, a gas turbine engine 2 for an aircraft comprises a nacelle 4 surrounding the engine 2. The engine 2 comprises, in serial flow arrangement a fan 6, a low pressure compressor 8, a high pressure compressor 10, a combustor 12, a high pressure turbine 14 and a low pressure turbine 16. The compressors 8, 10, the combustor 12 and the turbines 14, 16 are housed within a core casing 18 which is coupled to the nacelle 4 by suitable means such as struts or vanes 20. The general operation of a gas turbine engine is well known and therefore need not be described in further detail here. However, it should be understood that the present disclosure is not limited to gas turbine engines, but is also applicable to other engines and indeed other parts of an aircraft's structure.

In operation, the inlet 22 of the nacelle 4 may be prone to icing. This is potentially dangerous, since if ice forms on the nacelle inlet 22 and detaches from the nacelle inlet 22, it may be ingested into the engine 2 and cause damage thereto. Thus, the inlet 22 is provided with an anti-icing system 24. The anti-icing system 24 comprises a bleed air source 26 in the compressor, for example bleed air taken from the low pressure compressor 8, the high pressure compressor 10 or, as illustrated, between the low and high pressure compressors 8, 10. The air at the bleed point will be relatively hot (for example about 250° C.) and may therefore be used for anti-icing purposes. The precise point at which the bleed air is taken can be chosen to provide a suitable air temperature.

The bleed air is conducted to the nacelle inlet 22 by means of a bleed air supply duct 28, shown schematically. This is conducted to the nacelle 4 via the strut 20. The problem is the bleed air is not only hot, but also at relatively high pressure, typically 15-25 bar, such that if introduced directly into the nacelle inlet 22 it could potentially damage the nacelle inlet 22. Thus the anti-icing system also comprises a bleed air pressure regulation system 30 arranged in the bleed air flow duct 28. As illustrated, the pressure regulation system 30 is arranged within the nacelle 4, but it may be formed at any other position in the fluid path between the bleed air source 26 and the nacelle inlet 22.

Figure 2:
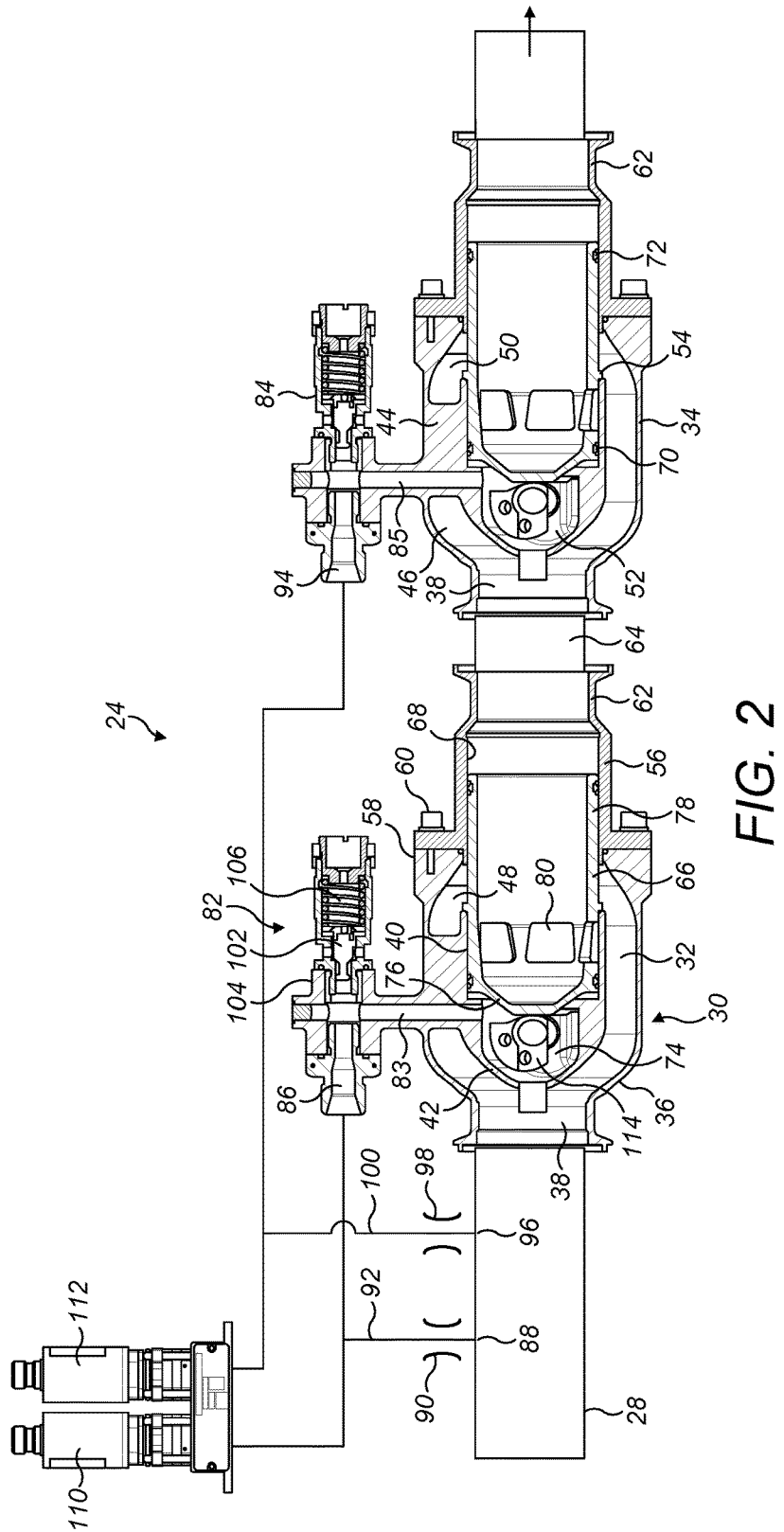
FIG. 2 shows the anti-icing system of the nacelle of FIG. 1 in greater detail.

The bleed air pressure regulation system 26 is shown in greater detail in FIG. 2.

The pressure regulation system comprises a first, upstream pressure regulating valve 32 and a second, downstream pressure regulating valve 34. In this embodiment, the structures of each pressure regulating valve 32, 34 are substantially the same. However, the pressure regulating valves 32, 34 are set to regulate to different pressures, as will be described further below.

Both pressure regulating valves 32, 34 comprise a valve body 36 having a bleed air inlet 38 and a regulating bore 40. The regulating bore 40 is defined in a central plug 42 spaced inwardly from the inner wall of the valve body 36 by supports such as circumferentially spaced arms 44. An annular bleed air flowpath 46 is defined between the valve body 36 and central plug 42. The regulating bore 40 is provided with a plurality of openings 48 in a side wall 50 thereof in fluid communication with the annular flow path 46.

The regulating bore 40 has a closed end 52 and an open end 54. The open end 54 is closed by an outlet fitting 56 attached to an end face 58 of the valve body 36 by fasteners such as bolts 60. The outlet 62 of the first pressure regulating valve 32 is connected to the inlet 38 of the second pressure regulating valve 34 by a duct 64.

A hollow bleed air flow regulating piston 66 is slidably and sealing received in the regulating bore 40 and in an internal bore 68 of the outlet fitting 52. Seals 70, 72 are provided at opposed ends of the piston 66 for sealing with the regulating bore 40 and the outlet fitting bore 68 respectively.

A regulating or control chamber 74 is defined between the piston head 76 and the closed end 52 of the regulating bore 40. In addition, a side wall 78 of the piston 66 comprises a plurality of apertures 80 which are movable axially with the piston 66 into and out of alignment with the openings 48 in the regulating bore 40 to regulate the flow of bleed air through the pressure regulating valves 32, 34.

The control chamber 74 of the upstream valve 32 is fluidly connected to a first pressure setting valve 82 via an inlet 83. The control chamber 74 of the downstream valve 34 is fluidly connected to a second pressure setting valve 84 via an inlet 85. The respective pressure setting valves 82, 84 are similar in structure but as will be described further below are set to different pressures.

First pressure setting valve 82 comprises a pressure inlet 86 which is fluidly connected to an inlet 88 in the bleed air supply duct 28 upstream of the first pressure regulating valve 32. A first throttle valve 90 is arranged in the pressure tap line 92 between the inlet 88 and the first pressure setting valve 82 to limit the flow of bleed air into the pressure setting valve 82.

Second pressure setting valve 84 comprises a pressure inlet 94 which is fluidly connected to an inlet 96 in the bleed air supply duct 28 also upstream of the first pressure regulating valve 32. A second throttle valve 98 is arranged in the pressure tap line 100 between the inlet 94 and the second pressure setting valve 84 to limit the flow of bleed air into the second pressure setting valve 84.

Each pressure setting valve 82, 84 comprises a spring loaded valve element 102 which is received within a valve housing 104. The force applied by a spring 106 counteracts the pressure applied to the valve element 102 by the tapped bleed air flow, and when the pressure of the tapped bleed air exceeds the spring pressure, tapped bleed air is vented from the pressure setting valve 82, 84, thereby limiting the pressure applied to the control chamber 74 of the associated pressure regulating valve 32, 34 to the pressure set via the loading of the spring 106. The control pressure of each pressure regulating valve 32, 34 may therefore be set by an appropriate spring setting. The force applied by the spring 106, and thus the pressure setting of each pressure regulating valve 32, 34 may be varied by adjustment of a screw 108. In an alternative arrangement, fixed pressure setting valves may be employed. In fact any valve construction which allows the desired pressure to be set may be used.

As a safety measure, dump valves 110, 112 are connected to the pressure tap lines 92, 100. These valves may be opened when in order effectively to vent the pressure setting valves 82, 84 and thus the pressure regulation chambers 74 of the pressure regulating valves 32, 34 to ambient, which will allow the pressure regulating valves 32, 34 to close thereby preventing flow of bleed air therethrough.

A rotary control element 114 may be provided in each control chamber 74 for manual or other movement of the piston 66 for example to an open position.

As discussed above, the respective pressure setting valves 82, 84 are set to different pressures, for example 6 bar and 7 bar. In particular, the upstream pressure setting valve 82 is set at a lower value than the downstream pressure setting valve 84. This means that the regulating pressure for the upstream pressure regulating valve 32 is set lower than that of the downstream pressure regulating valve 34. This is important in the operation of the system as will be described further below.

In use, bleed air is directed to the bleed air pressure regulation system 30 via the bleed air supply duct 28. The bleed air flows into the first pressure regulating valve 32. The pressure to which this pressure regulating valve 32 regulates is set by the pressure in the regulating chamber 74 thereof, which in turn is set by the first pressure setting valve 82. The piston 66 of the first pressure regulating valve 32 will move under the influence of the control pressure until it reaches an equilibrium position in which the piston apertures 80 overlap with the bore openings 48 to such an extent that the pressure of the bleed air flowing therethrough drops to the set pressure.

The bleed air then flows into the second pressure regulating valve 30 through the internal cavity of the piston 66, the valve outlet 62 and duct 64. As the pressure set in the second pressure regulating valve 34 is higher than that set in the first pressure regulating valve 32 and thus higher than the pressure of the bleed air leaving the first pressure regulating valve 32, the piston 66 of the second pressure regulating valve 34 will be forced to a fully open position, allowing the supply of bleed air to the nacelle inlet 22 via the outlet 62 of the second pressure regulating valve 34 at the pressure set in the first pressure regulating valve 32.

As the control pressure of the second pressure regulating valve 34 is completely independent of the flow exiting the first pressure regulating valve 32, that pressure will not influence its operation. Thus, even should the first pressure regulating valve 32 fail to a fully open position, the second pressure regulating valve 34 will still regulate the pressure set in the second pressure regulating valve 34, albeit to a higher pressure. However, that pressure will be chosen such that the nacelle inlet 22 will not be damaged. Similarly, should the second pressure regulating valve 34 fail to a fully open position, the first pressure regulating valve 32 will still regulate the pressure of the bleed air to the nacelle inlet 22. Thus the embodiment described will provide a redundant system which will allow for continued operation in the event of either pressure regulating valve 32, 34 failing.

While a particular embodiment has been described, it will be recognised that various modifications and changes may be made to the embodiment without departing from the general teaching of the disclosure.

For example, while particular structures of pressure regulating valve and pressure setting valve have been disclosed, the skilled person will recognise that other valves performing the same function but having different structure may equally be substituted for those illustrated. Also, the same design of valve need not be employed for each valve, so long as they perform the requisite function.

In addition, while the pressure setting valves are shown as being in fluid communication with the bleed air duct upstream of the first pressure regulating valve 32, they may be connected to a different independent pressure source or sources.

Also, while described for use in an anti-icing system for an engine nacelle, the disclosure may also find application in anti-icing of other aircraft structures.

The invention claimed is:

1. A bleed air pressure regulation system for an aircraft anti-icing system, the bleed air control system comprising a first, upstream pressure regulating valve and a second, downstream pressure regulating valve arranged in series in a bleed airflow path, the upstream pressure regulating valve being configured to regulate the bleed air flow to a first pressure and the downstream pressure regulating valve being configured to regulate the bleed air flow to a second, higher pressure, but to allow passage of bleed air therethrough from the upstream pressure regulating valve at the first pressure;

wherein the respective pressure regulating valves each have a regulating pressure chamber in fluid communication with a respective pressure setting valve and wherein the first pressure setting valve is configured to provide a first pressure to the regulating pressure chamber of the upstream pressure regulating valve and the second pressure setting valve is configured to provide a second, higher pressure to the regulating pressure chamber of the downstream pressure regulating valve; and wherein each pressure setting valve is in fluid communication with a bleed air inlet upstream of the first, upstream pressure regulating valve.

2. A bleed air pressure regulation system as claimed in claim 1, wherein an or each pressure regulating valve comprises a valve body having a bleed air inlet, a regulating bore, and a regulating piston slidably received within the control bore for regulating the flow of bleed air through the pressure regulating valve.

3. A bleed air pressure regulation system as claimed in claim 2, wherein the regulating pressure chamber is defined within the bore on one side of the regulating piston.

4. A bleed air pressure regulation system as claimed in claim 3, wherein the bore comprises one or more bleed air openings in a side wall thereof, and the piston comprises one or more bleed air inlets for selective alignment with the one or more bore bleed air openings and a bleed air outlet, such that when the one or more piston bleed air inlets align with the one or more bore openings bleed air may flow from the bleed air inlet, through the one or more bore openings, through the one or more piston bleed air inlets and out from a piston outlet to a further valve stage or to an area to be heated.

5. A bleed air pressure regulation system as claimed in claim 1, wherein an or each pressure setting valve is a pressure relief valve or a pressure limiting valve.

6. A bleed air pressure regulation system as claimed in claim 1, wherein an or each pressure setting valve is a variable pressure valve.

7. A bleed air pressure regulation system as claimed in claim 1, wherein a or the pressure setting valve is fluidly connected to a pressure dump valve.

8. A bleed air pressure regulation system as claimed in claim 1, comprising more than two pressure regulating valves arranged in series.

9. A bleed air pressure regulation system for an aircraft anti-icing system, the bleed air control system comprising a first, upstream pressure regulating valve and a second, downstream pressure regulating valve arranged in series in a bleed airflow path, the upstream pressure regulating valve being configured to regulate the bleed air flow to a first pressure and the downstream pressure regulating valve being configured to regulate the bleed air flow to a second, higher pressure, but to allow passage of bleed air therethrough from the upstream pressure regulating valve at the first pressure;

wherein the respective pressure regulating valves each have a regulating pressure chamber in fluid communication with a respective pressure setting valve and wherein the first pressure setting valve is configured to provide a first pressure to the regulating pressure chamber of the upstream pressure regulating valve and the second pressure setting valve is configured to provide a second, higher pressure to the regulating pressure chamber of the downstream pressure regulating valve; and wherein a or the respective pressure setting valve are connected to the bleed air inlet upstream of the first, upstream pressure regulating valve by a bleed air feed line, and wherein a flow restriction is provided in the bleed air feed line to control or limit the flow of bleed air into the bleed air feed line.

10. A method of regulating bleed air in an anti-icing system comprising flowing bleed air through a first, upstream pressure regulating valve and a second, downstream pressure regulating valve arranged in series with the first pressure regulating valve, and setting the regulating pressure of the second pressure regulating valve to be higher than that of the first pressure regulating valve and such that regulated bleed air may pass therethrough from the first pressure regulating valve at the first pressure;

wherein the respective regulating pressures are set by means of pressure setting valves arranged in fluid communication with the bleed air flow upstream of the first pressure regulating valve.

\* \* \* \* \*